(12) United States Patent
Kopchick et al.

(10) Patent No.: US 9,109,547 B2
(45) Date of Patent: Aug. 18, 2015

(54) EXHAUST GAS RECIRCULATION COOLER, SYSTEM, AND METHOD THEREOF

(71) Applicant: GM GLOBAL TECHNOLOGY OPERATIONS LLC, Detroit, MI (US)

(72) Inventors: Joseph C. Kopchick, Warren, MI (US); Hossein Bina, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 13/870,037

(22) Filed: Apr. 25, 2013

(65) Prior Publication Data

US 2014/0318512 A1    Oct. 30, 2014

(51) Int. Cl.
*F02M 25/07*    (2006.01)

(52) U.S. Cl.
CPC ........... *F02M 25/0737* (2013.01); *Y02T 10/121* (2013.01)

(58) Field of Classification Search
CPC .............. F02M 25/07; F02M 25/0726; F02M 25/0731; F02M 25/0734; F02M 25/0737; F02M 25/0738; F28F 13/18; F28F 13/182; F28F 13/185; F28F 13/187; F28F 3/02; F28F 3/025; F28F 3/06; F28D 9/00; F28D 9/0006
USPC ...................... 123/568.12; 165/159
See application file for complete search history.

(56) References Cited

U.S. PATENT DOCUMENTS

| | | | |
|---|---|---|---|
| 6,244,256 B1 * | 6/2001 | Wall et al. | 123/568.12 |
| 2004/0129411 A1 * | 7/2004 | Ayres | 165/133 |
| 2008/0011464 A1 * | 1/2008 | Oofune et al. | 165/157 |
| 2008/0169093 A1 * | 7/2008 | Ohfune et al. | 165/164 |
| 2011/0271937 A1 | 11/2011 | Knafl et al. | |

FOREIGN PATENT DOCUMENTS

| | | |
|---|---|---|
| DE | 102005059717 A1 | 7/2006 |
| DE | 102008025795 A1 | 12/2008 |

\* cited by examiner

*Primary Examiner* — Hung Q Nguyen
(74) *Attorney, Agent, or Firm* — Quinn Law Group, PLLC

(57) ABSTRACT

An exhaust gas recirculation (EGR) cooler for cooling exhaust gas includes at least one channel configured to allow the exhaust gas to flow through it, and a casing defining a cooling chamber around the at least one channel. The cooling chamber is configured to enable heat transfer between the exhaust gas and the coolant. The at least one channel has an interior surface and an exterior surface made of a first metal and a second metal, respectively, and configured to be in contact with the exhaust gas and the coolant, respectively. The second metal has a higher thermal conductivity than the first metal. The casing includes a coolant inlet and a coolant outlet configured to enable the coolant to enter and exit the cooling chamber, and an exhaust gas inlet and an exhaust gas outlet configured to enable the exhaust gas to enter and exit the at least one channel.

18 Claims, 2 Drawing Sheets

EXHAUST GAS RECIRCULATION COOLER, SYSTEM, AND METHOD THEREOF

TECHNICAL FIELD

The present invention relates to an exhaust gas recirculation (EGR) cooler, system, and method for cooling exhaust gas from an internal combustion engine with a coolant.

BACKGROUND

Exhaust gas recirculation (EGR) is a technique employed with internal combustion engines to reduce nitric oxides (NOx) in the engine's exhaust gas and improve fuel economy. In EGR systems, a portion of the exhaust gas is recirculated to the intake manifold of the engine where the exhaust gas displaces the amount of combustible matter or oxygen normally inducted into the engine, thereby reducing the rate of NOx formation. In addition, many EGR systems implement an EGR cooler in which a coolant, either liquid or air, is used as a cooling medium to cool the exhaust gas. This results in lower combustion chamber temperatures, which in turn increases the effectiveness of the EGR system in reducing the NOx formation. The components of the EGR cooler are often made of the same material, such as stainless steel.

SUMMARY

An exhaust gas recirculation (EGR) cooler for cooling exhaust gas from an internal combustion engine with a coolant is provided. The EGR cooler includes at least one channel configured to allow the exhaust gas to flow through it. The at least one channel has an interior surface and an exterior surface. The interior surface is made of a first metal, and is configured to be in contact with the exhaust gas. The exterior surface is made of a second metal having a higher thermal conductivity than the first metal, and is configured to be in contact with the coolant.

The EGR cooler also includes a casing defining a cooling chamber around the at least one channel. The cooling chamber is configured to enable heat transfer between the exhaust gas and the coolant. The casing includes a coolant inlet and a coolant outlet configured to enable the coolant to enter and exit the cooling chamber. The casing also includes an exhaust gas inlet and an exhaust gas outlet configured to enable the exhaust gas to enter and exit the at least one channel.

An exhaust gas recirculation (EGR) system for cooling exhaust gas from an internal combustion engine with a coolant is also provided. The EGR system includes the EGR cooler described above. The EGR system also includes an exhaust gas circuit and a coolant circuit. The exhaust gas circuit is configured to circulate the exhaust gas from the internal combustion engine through the at least one channel of the EGR cooler and back to the internal combustion engine. The coolant circuit is configured to circulate the coolant through the cooling chamber of the EGR cooler such that heat is transferrable between the exhaust gas and the coolant. As explained above, the interior surface and the exterior surface of the at least one channel of the EGR cooler are made of a first metal and a second metal, respectively, and are configured to be in contact with the exhaust gas and the coolant, respectively. The second metal has a higher thermal conductivity than the first metal.

A method for cooling exhaust gas from an internal combustion engine via the EGR cooler described above is further provided. The method includes first circulating the exhaust gas through the at least one channel of the EGR cooler. The method then includes circulating a coolant through the cooling chamber such that heat is transferred between the exhaust gas and the coolant. The exhaust gas is in contact with the interior surface of the at least one channel of the EGR cooler, and the coolant is in contact with the exterior surface. As explained above, the interior surface is made of a first metal, and the exterior surface is made of a second metal having a higher thermal conductivity than the first metal.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
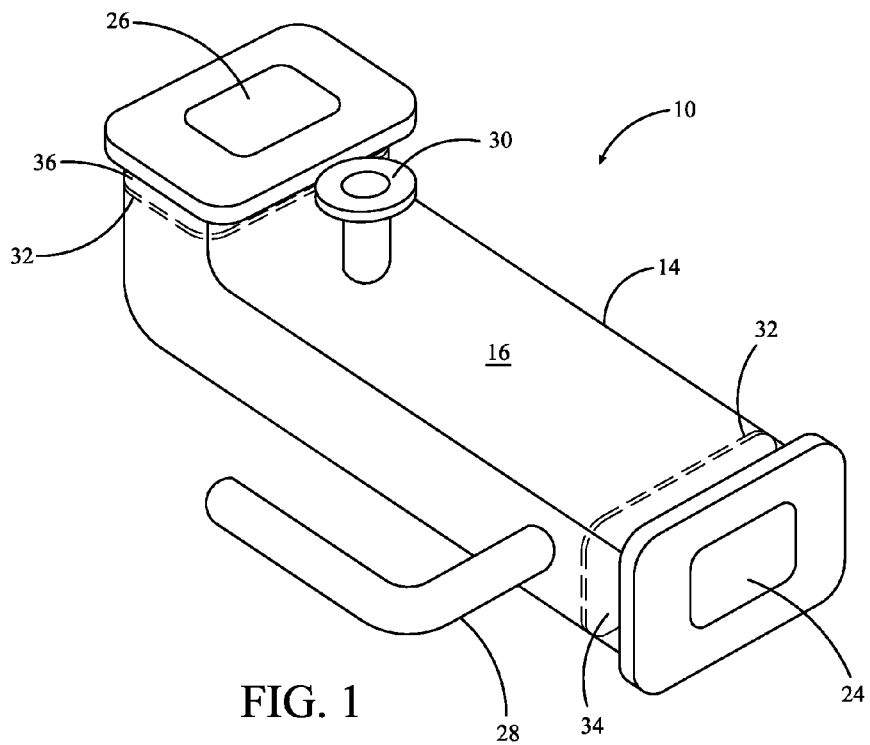
FIG. 1 is a schematic, perspective view of an exhaust gas recirculation (EGR) cooler.
Figures 2A, 2B:
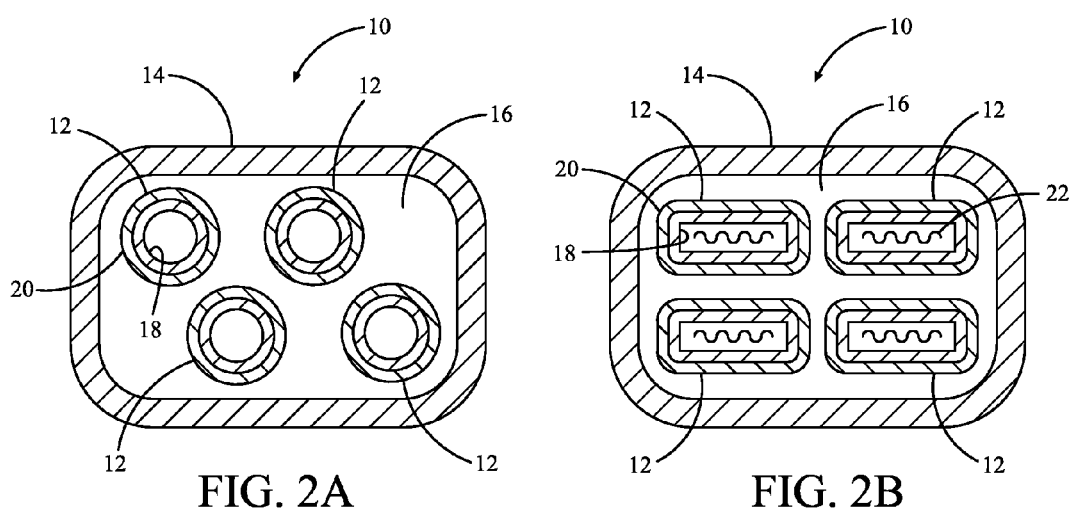
FIGS. 2A and 2B are schematic, cross-sectional views of the EGR cooler of FIG. 1 according to different embodiments of the present invention.

Referring to the drawings, wherein like reference numbers correspond to like or similar components wherever possible throughout the several figures, an exhaust gas recirculation (EGR) cooler 10 is shown in FIG. 1. The EGR cooler 10 generally is a heat exchanger used to cool exhaust gas from an internal combustion engine 102 via a coolant, as seen in the EGR system 100 in FIG. 3 and described in method 200 hereinafter. While the present invention is described with respect to the EGR cooler 10, it should be appreciated that it may apply to any heat exchanger used in the exchange of heat between two fluids. The EGR cooler 10 generally includes at least one channel 12 and a casing 14 that defines a cooling chamber 16 around the at least one channel 12, as seen in FIGS. 2A and 2B. The channels 12 are configured to allow the exhaust to flow through them. The cooling chamber 16 is configured to enable the heat transfer between the exhaust gas and the coolant.

Referring now to FIGS. 2A and 2B, each of the channels 12 generally may be any passageway capable of allowing the exhaust gas to flow through it. For example, in one embodiment, the channels 12 may be tubes, as shown in FIG. 2A. In another embodiment, the channels 12 may be hollow plates, as shown in FIG. 2B. While FIGS. 2A and 2B show the EGR cooler 10 as having four channels 12, it should be appreciated that it may have any number of channels 12. In addition, while FIGS. 2A and 2B show the EGR cooler 10 as having a substantially rectangular cross-section, it should be appreciated that it may have a cross-section of any regular or irregular geometric shape, including, but not limited to, a circle.

Each channel 12 has an interior surface 18 and an exterior surface 20 made of a first metal and a second metal, respectively. The second metal generally has a higher thermal conductivity than the first metal. In one embodiment, the first metal may be a non-corrosive material, including, but not limited to, stainless steel. The second metal may be a high heat conductive, including, but not limited to, copper. The interior surface 18 and the exterior surface 20 may be formed by cladding the first metal and the second metal together.

Each channel 12 also may include a fin 22 located inside of the channel 12, as seen in FIG. 2B, to further the heat transfer between the exhaust gas and the coolant. The fins 22 may be made of any metal, including, but not limited to, stainless steel.

Referring back to FIG. 1, the casing 14 has an exhaust gas inlet 24, an exhaust gas outlet 26, a coolant inlet 28, and a coolant outlet 30. The exhaust gas inlet 24 and the exhaust gas outlet 26 are configured to enable the exhaust gas to enter and exit the channels 12. The coolant inlet 28 and the coolant outlet 30 are configured to enable the coolant to enter and exit the cooling chamber 16.

The EGR cooler 10 may further include end plates 32 at the exhaust gas inlet 24 and the exhaust gas outlet 26 to form an inlet chamber 34 and an outlet chamber 36 that serve to prevent leaking of the exhaust gas into the coolant, and vice versa. The end plates 32 may have openings connected by the channels 12 such that the exhaust gas may flow from the inlet chamber 34 to the outlet chamber 36 through the channels 12. The end plates 32 may be made of any metal, including, but not limited to, stainless steel.

Figure 3:
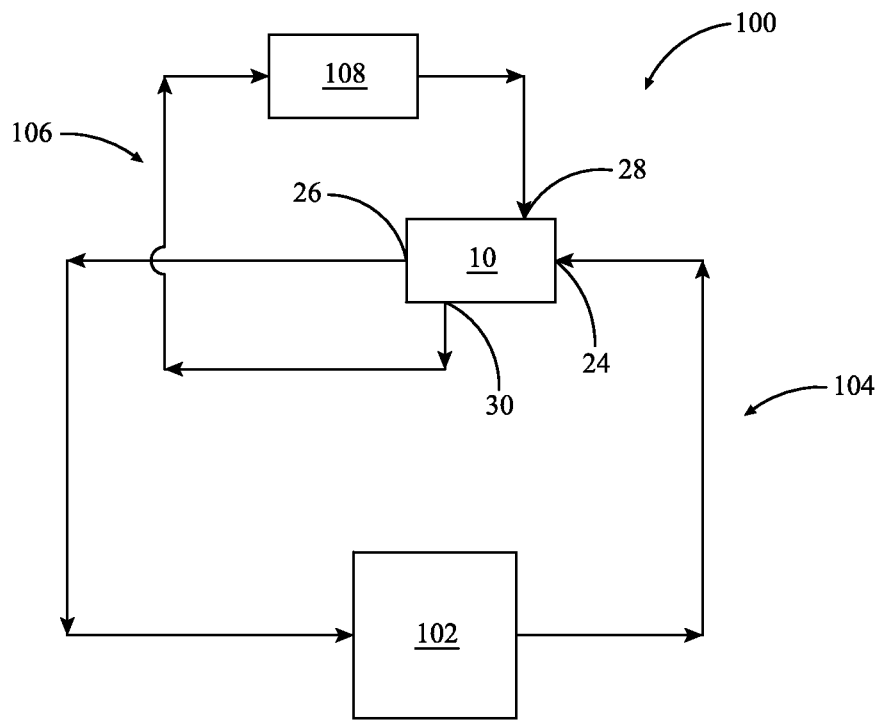
FIG. 3 is a schematic, flow and block diagram of an EGR system incorporating the EGR cooler of FIG. 1.

Referring now to FIG. 3, an EGR system 100 for cooling the exhaust gas with the coolant is shown. The system includes the EGR cooler 10, an exhaust gas circuit 104, and a coolant circuit 106. The exhaust gas circuit 104 is connected to the exhaust gas inlet 24 and the exhaust gas outlet 26 of the EGR cooler 10, and is configured to circulate part of the exhaust gas from the internal combustion engine 102 through the channels 12 and back to the internal combustion engine 102. Similarly, the coolant circuit 106 is connected to the coolant inlet 28 and the coolant outlet 30 of the EGR cooler 10, and is configured to circulate the coolant through the cooling chamber 16 such that heat is transferrable between the exhaust gas and the coolant.

The EGR system 100 also may include a cooler 108 configured to cool the coolant after it has exited the cooling chamber 16, and therefore has absorbed heat from the exhaust gas. This enables the coolant to continue to be circulated through the cooling chamber 16 to exchange heat with the exhaust gas. The cooler 108 may be any heat exchanger, including, but not limited to, a radiator.

Figure 4:
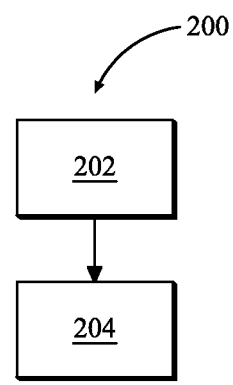
FIG. 4 is a schematic, flow diagram illustrating a method of using the EGR cooler of FIG. 1 to cool exhaust gas from an internal combustion engine.

Referring now to FIG. 4, a method 200 for cooling the exhaust gas from the internal combustion engine 102 via the EGR cooler 10 is provided. Method 200 begins at step 202 in which the exhaust gas is circulated through at least one channel 12 of the EGR cooler 10. As the exhaust gas flows through the at least one channel 12, it is in contact with the interior surface 18 of the channel 12, where the interior surface 18 is made of a first metal. As explained above, the first metal may be, but is not limited to, stainless steel.

After step 202, method 200 proceeds to step 204. At step 204, the coolant is circulated through the cooling chamber 16 of the EGR cooler 10 such that heat is exchanged between the exhaust gas and the coolant. As the coolant flows through the cooling chamber 16, it will be in contact with the exterior surface 20 of the channel 12, where the exterior surface 20 is made of a second metal having a higher thermal conductivity than the interior surface 18. As explained above, the second metal may be, but is not limited to, copper.

It should be appreciated that steps 202 and 204 generally occur at the same time in order to achieve the heat transfer between the exhaust gas and the coolant, and as such, are interchangeable.

In embodiments in which the EGR system 100 includes a cooler 108, method 200 may further include circulating the coolant through the cooler 108 to cool the coolant after it has exited the cooling chamber 16, and therefore, has absorbed heat from the exhaust gas, as explained above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An exhaust gas recirculation (EGR) cooler for cooling exhaust gas from an internal combustion engine with a coolant, the EGR cooler comprising:
   at least one channel configured to allow the exhaust gas to flow therethrough, the at least one channel having an interior surface and an exterior surface; and
   a casing defining a cooling chamber around the at least one channel, the cooling chamber being configured to enable heat transfer between the exhaust gas and the coolant, the casing having:
      a coolant inlet and a coolant outlet configured to enable the coolant to enter and exit the cooling chamber; and
      an exhaust gas inlet and an exhaust gas outlet configured to enable the exhaust gas to enter and exit the at least one channel;
   wherein the interior surface of the at least one channel is made of a first metal, and is configured to be in contact with the exhaust gas;
   wherein the exterior surface of the at least one channel is made of a second metal having a higher thermal conductivity than the first metal, and is configured to be in contact with the coolant; and
   wherein only the at least one channel is disposed inside the casing so as to enable heat transfer between all the exhaust gases flowing through the EGR cooler and the coolant flowing through the cooling chamber.

2. The EGR cooler of claim 1 wherein the first metal is stainless steel and the second metal is copper.

3. The EGR cooler of claim 1 wherein the first metal and the second metal are cladded together.

4. The EGR cooler of claim 1 further comprising at least one fin inside of the at least one channel.

5. The EGR cooler of claim 4 wherein the at least one fin is made of stainless steel.

6. The EGR cooler of claim 1 further comprising end plates at the exhaust gas inlet and the exhaust gas outlet to form an inlet chamber and an outlet chamber.

7. The EGR cooler of claim 6 wherein the end plates are made of stainless steel.

8. An exhaust gas recirculation (EGR) system for cooling exhaust gas from an internal combustion engine with a coolant, the EGR system comprising:
   an EGR cooler having:
      a plurality of channels each configured to allow the exhaust gas to flow therethrough, each of the channels having an interior surface and an exterior surface; and
      a casing defining a cooling chamber around the channels, the cooling chamber having a coolant inlet and a coolant outlet configured to enable the coolant to enter and exit the cooling chamber, and an exhaust gas inlet and an exhaust gas outlet configured to enable the exhaust gas to enter and exit the channels;

an exhaust gas circuit configured to circulate the exhaust gas from the internal combustion engine through the channels of the EGR cooler and back to the internal combustion engine; and a coolant circuit configured to circulate the coolant through the cooling chamber such that heat is transferrable between the exhaust gas and the coolant;

wherein the interior surface of each of the channels is made of a first metal, and is configured to be in contact with the exhaust gas;

wherein the exterior surface of the each of the channels is made of a second metal having a higher thermal conductivity than the first metal, and is configured to be in contact with the coolant; and wherein the cooling chamber surrounds all the channels disposed inside the casing so as to enable heat transfer between all the exhaust gases flowing through the EGR cooler and the coolant flowing through the cooling chamber.

9. The EGR system of claim 8 wherein the first metal is stainless steel and the second metal is copper.

10. The EGR system of claim 8 wherein the first metal and the second metal are cladded together.

11. The EGR system of claim 8 wherein the EGR cooler further comprises at least one fin inside of the at least one channel.

12. The EGR system of claim 11 wherein the at least one fin is made of stainless steel.

13. The EGR system of claim 8 wherein the EGR cooler further comprises end plates at the exhaust gas inlet and the exhaust gas outlet to form an inlet chamber and an outlet chamber.

14. The EGR system of claim 13 wherein the end plates are made of stainless steel.

15. The EGR system of claim 8 further comprising a cooler located in the coolant circuit, the cooler being configured to cool the coolant after it exits the cooling chamber.

16. A method for cooling exhaust gas from an internal combustion engine via an exhaust gas recirculation (EGR) cooler having at least one channel within a cooling chamber defined by a casing, the method comprising:

circulating the exhaust gas through the at least one channel; and circulating a coolant through the cooling chamber such that heat is transferred between the exhaust gas and the coolant;

wherein the at least one channel has an interior surface made of a first metal, and an exterior surface made of a second metal having a higher thermal conductivity than the first metal; and wherein the coolant is in contact with the exterior surface, and the exhaust gas is in contact with the interior surface;

wherein the cooling chamber is disposed around the at least one channel such that the at least one channel is completely surrounded by the cooling chamber; and wherein only the at least one channel is disposed inside the casing so as to enable heat transfer between all the exhaust gases flowing through the EGR cooler and the coolant flowing through the cooling chamber.

17. The method of claim 16 wherein the first metal is stainless steel and the second metal is copper.

18. The method of claim 16 further comprising circulating the coolant through a cooler to cool the coolant after it exits the cooling chamber.

\* \* \* \* \*